No. 12,010. Reissued July 15, 1902.

M. J. BENTSON.

EXCAVATING MACHINE.

(Application filed Mar. 8, 1902.)

4 Sheets—Sheet 1.

Witnesses
J. H. Hinkel
Wm. Gillman Jr.

Inventor
Hans J. Bentson
By Foster Freeman
Attorneys

No. 12,010. Reissued July 15, 1902.

H. J. BENTSON.

EXCAVATING MACHINE.

(Application filed Mar. 6, 1902.)

4 Sheets—Sheet 2.

Witnesses

F. G. Lickel

Wm. Ellmann Jr.

Inventor

Hans J. Bentson

By Fritz Freeman

Attorneys

No. 12,010.

Reissued July 15, 1902.

H. J. BENTSON.

EXCAVATING MACHINE.

(Application filed Mar. 8, 1902.)

4 Sheets—Sheet 3.

Witnesses

J. G. Stickel

Jno. Gilman, Jr.

Inventor

Hans J. Bentson

By Fred Freeman

Attorney

No. 12.010.

Reissued July 15, 1902.

H. J. BENTSON.

EXCAVATING MACHINE.

(Application filed Mar. 8, 1902.)

4 Sheets—Sheet 4.

Inventor

Hans J. Bentson

By Louis Freeman

Attorneys

Witnesses

Chas. Gilman Jr.

BEST AVAILABLE COPY

UNITED STATES PATENT OFFICE.

HANS J. BENTSON, OF CHICAGO, ILLINOIS, ASSIGNOR TO FREDERICK HOWARD.

EXCAVATING-MACHINE.

SPECIFICATION forming part of Reissued Letters Patent No. 12,010, dated July 15, 1902.

Original No. 646,674, dated April 3, 1900. Application for reissue filed March 3, 1902. Serial No. 97,376.

*To all whom it may concern:*

Be it known that I, HANS J. BENTSON, a citizen of the United States, residing at Chicago, in the county of Cook and State of Illinois, have invented certain new and useful Improvements in Excavating-Machines; and I do hereby declare the following to be a full, clear, and exact description of the invention, such as will enable others skilled in the art to which it appertains to make and use the same.

My invention relates to a novel construction in an excavating-machine, the object being to provide a simple, durable, and efficient device of this character; and it consists in the features of construction and combinations of parts hereinafter fully described and claimed.

Figure 1:
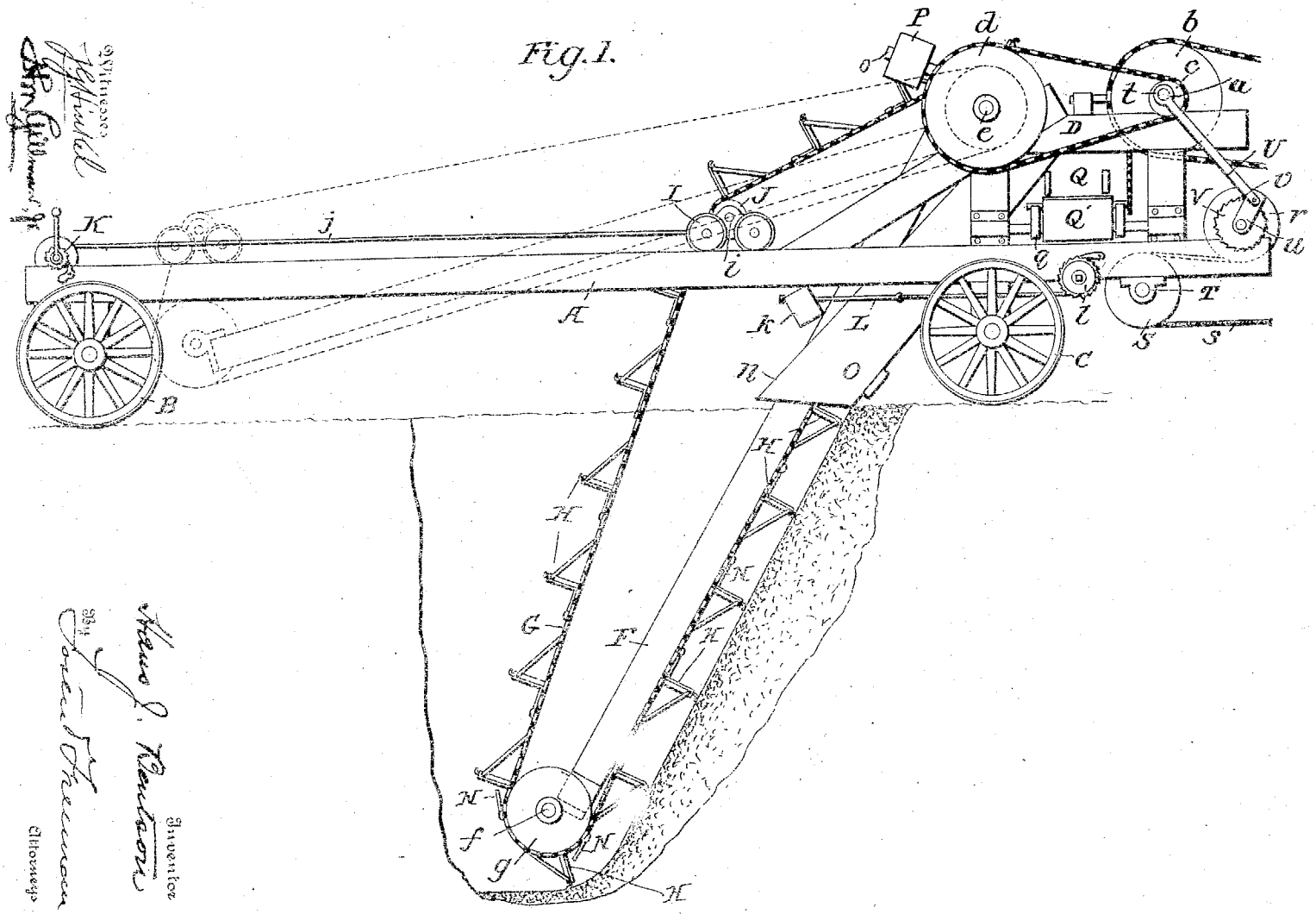
Figure 2:
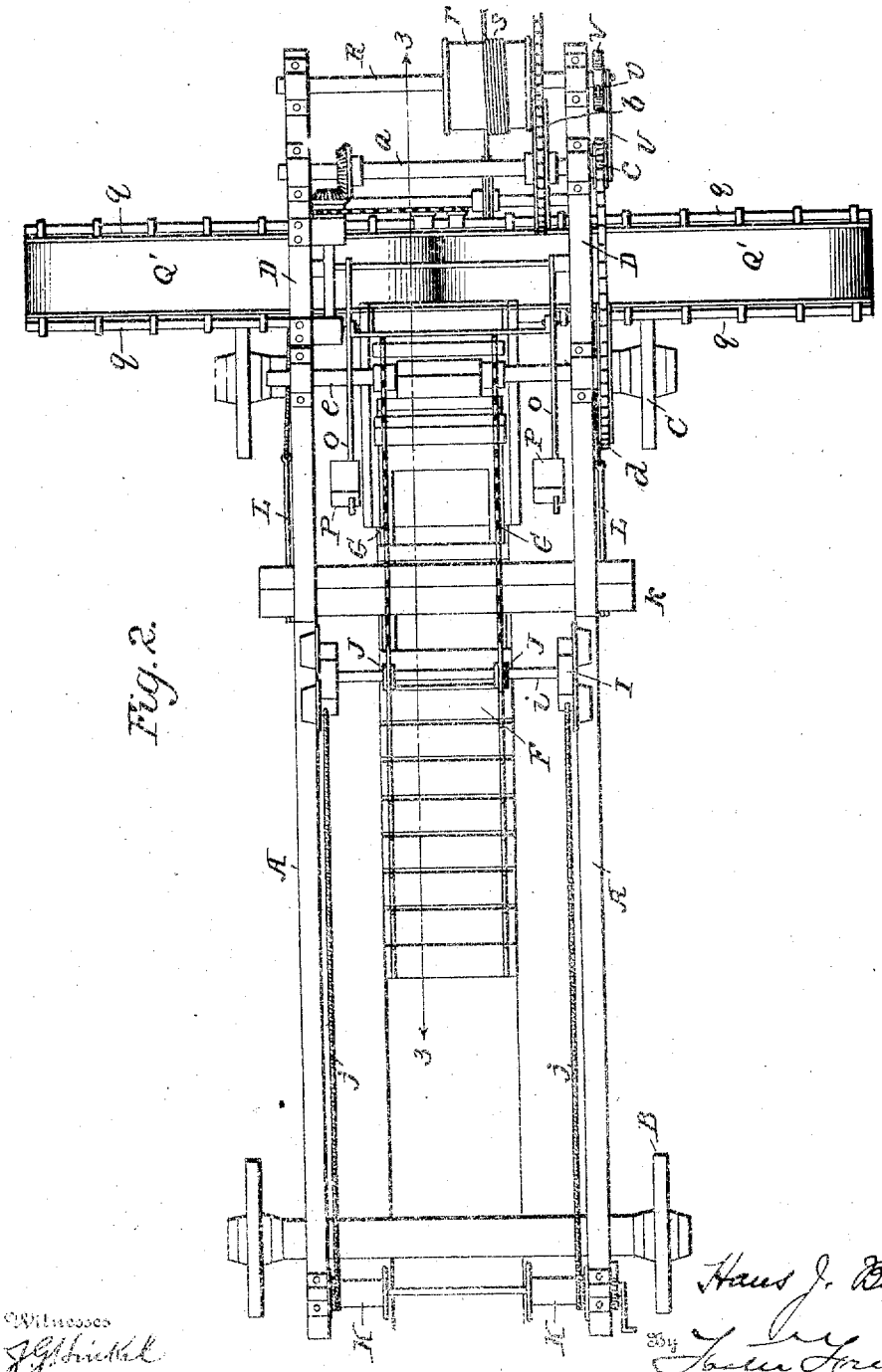
Figure 3:
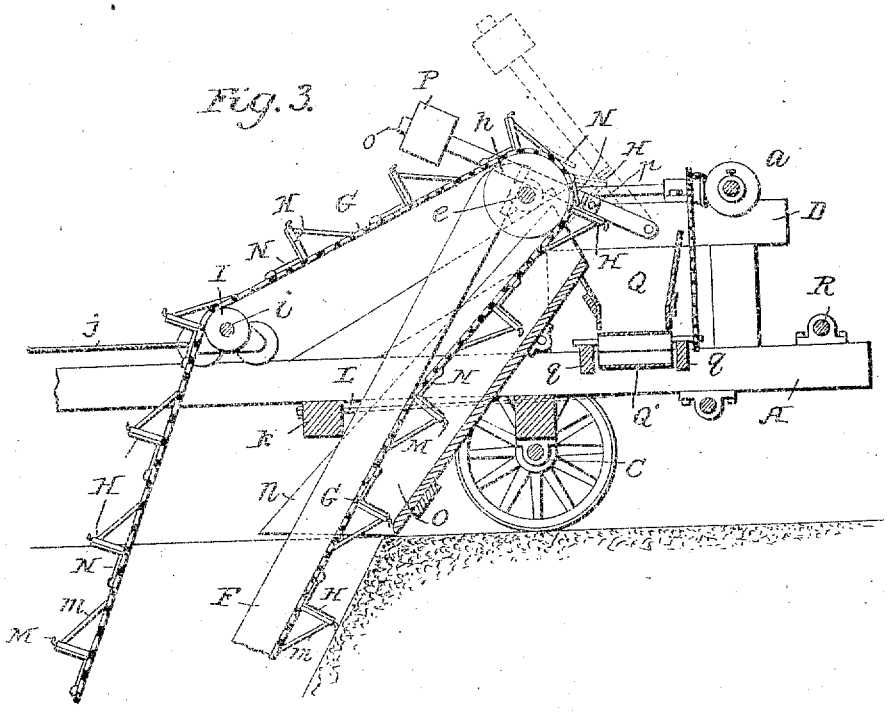
Figure 4:
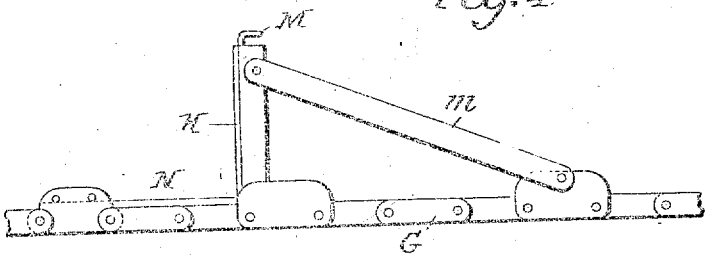
Figure 6:
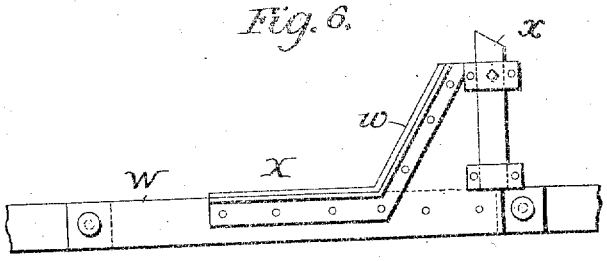
Figure 5:
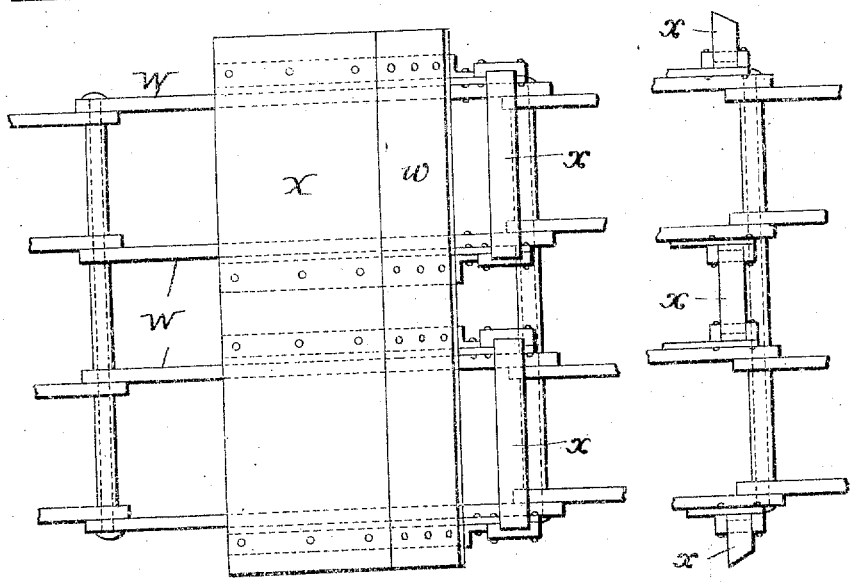
Figure 7:
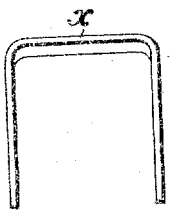
Figure 8:
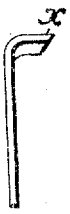

In the accompanying drawings, illustrating my invention, Figure 1 is a side elevation of a machine constructed in accordance with my invention. Fig. 2 is a top plan view of same. Fig. 3 is a fragmentary longitudinal section on the line 3 3, Fig. 2. Fig. 4 is a detail side elevation of one of the shovels I employ. Fig. 5 is a front elevation showing a modified form of chain and shovel carried thereby. Fig. 6 is a side elevation of same. Figs. 7 and 8 are detail elevations of cutters which I employ for loosening the earth to be taken up by the shovels.

In excavating-machines it is absolutely essential, first, to loosen the earth, so that it can be easily taken up by the shovels; second, to so construct the shovels that the earth taken up thereby can be readily removed therefrom, and, third, to hold the cutters and shovels to their work, so that they will have no opportunity to slide over without taking up the earth.

So far as I am informed excavating-machines heretofore have been constructed with buckets which were provided with sharp edges to cut the earth and immediately receive same; but such machines proved inoperative, owing to the fact that no adequate means for emptying the buckets could be provided. This difficulty is particularly great when excavating wet earth and clay, as the latter become tightly packed into the bucket and must be dug out at the expense of great labor and much time.

One feature of my present invention consists in the novel construction of the shovels or scrapers for elevating the earth.

Another feature of my invention consists in the novel construction of devices for scraping the earth from said shovels or scrapers.

Another feature of my invention consists in the devices for adjusting the position of the beam carrying the excavating devices and regulating the tension of the chain carrying the shovels or scrapers.

Still another feature of my invention consists in the devices for continually moving the machine forward in accordance with the rapidity with which the excavation is effected.

To these and other ends my invention consists of a frame comprising two parallel beams A, mounted upon trucks B and C, the latter of which may be moved pivotally, if desired. Mounted upon said beams A above said truck C are frames D, carrying the operating mechanism. The latter consists of a drive-shaft *a*, journaled in bearings on said frames D and carrying sprocket-wheels *b* and *c*, the former of which is adapted to be geared to a traction-engine or portable steam or gasolene engine, and the latter of which is adapted to be geared to a sprocket-wheel *d* on a counter-shaft *e*, likewise journaled in bearings on said frames D. Pivotally mounted upon said counter-shaft *e* at one end is a frame F, comprising two parallel beams connected by cross-pieces at their ends. At its free end said frame F carries a shaft *f*, having sprocket-wheels *g* rigid therewith, over which and sprocket-wheels *h*, carried by said counter-shaft *e*, sprocket-chains G, carrying excavating devices H, are trained. Movable on said beams A is a carriage I, carrying a shaft *j*, provided with idlers J, over which said sprocket-chains G run. Said carriage I is connected by means of cords *j* with windlass devices K, mounted upon the end portions of said beams A and by means of which said carriage is moved to draw said sprocket-chains taut and hold them so, and likewise when desired to raise said frame F. The latter is held in any desired position by means of a beam *k*, interposed between it and the beams A and firmly held to prevent said frame F from rising by means of cords L, connected with windlass devices *l* on said beams A adjacent said truck C. Each of said excavating devices H comprises a plate secured at its inner end to links of said chains G in any suitable manner and held in position at an angle of about ninety degrees to said chains by means of braces *m*, pivotally secured to said plates at one end and to links of the chains at their other ends. Cutters M are also secured below said plates and project beyond the outer edge of same, so that the earth loosened thereby will be taken up by the next succeeding plate. Plates N are secured to links of said chain adjacent their upper edges and rest with their lower edges upon said excavating-plates, thereby forming aprons by means of which the earth taken up by said plates is prevented from falling back into the channel. Said aprons N likewise serve as scrapers for the inner ends of said plates, as hereinafter described.

Each plate or apron N normally forms, in conjunction with the next succeeding excavating blade or plate H, a shovel for elevating the material, as best shown in Fig. 4, it being seen that the plate or apron N normally prevents the material which is being carried up by the shovel from falling back through the endless carrier, and hence that the plate or apron N serves as a back for the shovel from the time it receives its load until the time when it reaches the point of discharge and that upon arriving at such point this plate or back N swings outwardly in a direction to eject the material.

As shown in Fig. 4, the plate or apron N is attached to a link-section of the carrier which is ahead of the link-section to which the scraper or blade H is attached, so that when the carrier is passing about a direction-changing device, such as the upper sprocket *h*, Fig. 3, the plate N will swing outwardly and independently of the plate H with which it is associated, and since the link-sections are hinged together or articulated, as in link-belt carriers, the plate N will swing as a pivoted plate with relation to its associated plate H. It will also be seen by further referring to the drawings that the back plate N of any one bucket is also entirely independent in its swing (which occurs at the point of discharge) of both the preceding and succeeding blades or plates H, and hence that by thus independently attaching the plates N to parts of the endless carrier which form articulated sections independent of the sections to which the plates H are attached the shovels can be set apart at any desired distances without proportionally lengthening the links or sections and that when a shovel reaches the point of discharge its back plate will automatically swing out in a direction to eject the material, which action on the part of the back plate or ejector is not dependent upon any swing or tilt on the part of the plate H of the preceding shovel. In this way the action of each swinging back plate N can be timed with exclusive reference to the moment at which the shovel of which it forms a complemental member arrives at a point suitable for discharge. It will also be seen by dotted lines, Fig. 3, that the shovels discharge at a time when they are right side up.

Figs. 1 and 3 clearly show the swinging plates N each associated with one plate or blade H, with quite a space between each plate N and the plate or blade H next ahead of it. This arrangement also permits the plates H to operate as excavating devices when passing about the lower sprocket, as in Fig. 1, in which it will also be seen that the excavating is performed at the rear of the machine and that the carrier-frame inclines upwardly and forwardly toward the front end of the machine. In Fig. 3 the outward swing of one of the plates N, passing about the upper sprocket, is indicated in dotted lines, the plate H, with which said plate N is associated, being also indicated in dotted lines. It will also be seen that the plate N, which forms a cleaner or ejector and which normally forms a part of the shovel, is attached at a point outside of such shovel. An apron O, provided with side flanges *n*, is pivotally mounted between said beams A and depends therefrom with its lower edge resting upon the ground and extending practically parallel with direction of motion of said excavating devices H, so that the latter scrape same, thereby preventing the earth from falling off same. Pivotally secured to said beams A and extending over said apron O are parallel arms *o*, carrying weights P at their free ends and connected between their ends by a cross-bar *p*, lying in the path of the scraper-plates and adapted to be engaged by the latter as they turn over said sprocket-wheels *h*, thereby being raised and scraping the earth from said plates in an obvious manner. Just previous to engaging said cross-bar *p* said scraper-plates are partially scraped by said aprons N, which as they reach the sprocket-wheels *h* have their lower ends forced outwardly, as indicated in dotted lines in Fig. 3, thereby shoving the earth toward the outer edges of said scraper-plates. As each of the latter moves out of the path of and releases said cross-bar *p* said arms *o* suddenly turn to the lower limits of their movement, which is determined by a suitable stop, and being brought to a sudden standstill obviously cause any earth clinging to cross-bar *p* to drop. The earth thus scraped off the plates by said cross-bar falls into a trough Q, whence it is carried by means of belt conveyers Q′ to each side of the channel and dropped upon the ground or into suitable receptacles, as desired. Said belt conveyers Q′ are trained over pulleys revolubly mounted in frames *q*, removably mounted on said machine and receiving motion by means of suitable transmission devices, particular description of which is considered superfluous. Upon the extreme end portions of said beams A is a shaft R, journaled in bearings and carrying a drum *r* between its ends, upon which a cable

*s* is adapted to be wound, said cable being trained over a pulley S on a parallel shaft T, journaled in bearings on said beams A and secured at its free end to a stake driven into the ground ahead of and in the path of the channel to be cut. The drive-shaft *a* carries a crank *t* at one end, connected by means of a pitman U with an arm *u*, carrying a pawl *v*, adapted to engage a ratchet-wheel V on said shaft R, thereby slowly turning the latter and advancing the entire machine. The traction-engine driving said machine is preferably so placed that as the latter advances it pushes the traction-engine along a corresponding distance.

The excavating devices may be variously constructed, and, broadly speaking, my invention consists in providing flat plates extending transversely or at an obtuse angle to the direction of motion of the devices carrying same, so that they can be readily scraped at a suitable point in their course. As shown in Figs. 5 and 6, said excavating devices may comprise a sprocket-chain W, having links of greater length than ordinarily, so that one set of links in horizontal alinement carries a scraper-plate *w*, apron X, and cutter *x*. In this case the said apron X and scraper-plate *w* are made in one piece and firmly secured to said links by means of angle-irons riveted to both the links and plates. The cutter *x* is mounted immediately below the plate *w* and serves as a brace for the latter.

The cutter *x* may consist of a single strip of metal bent to a U shape or of two strips each having a bent end, as shown in Fig. 8.

My machine has proven practical for excavating any character of soft earth—such as clay, sand, loam, gravel, and pebbly earth—making a clear-cut channel, which as illustrated in Figs. 1 and 3 is formed in rear of the machine or in rear of the forward part thereof, it being seen that the endless conveyer-blade composed of articulated link-sections traverses a conveyer or elevator frame F, which trails rearwardly, so as to incline downwardly and rearwardly from the forward part of the machine. With this arrangement the projecting plates or blades H, having suitable cutting portions M, scrape or cut the soil from the bottom to the top of the trench or excavation, as indicated in Fig. 1, which illustrates at the bottom of the trench certain of the excavating-shovels formed by the plates H and N in the act of cutting and taking up the earth, it being observed that at the point where the endless belt is commencing to pass around the lower sprocket *g* in Fig. 1 the outwardly-swinging action of one of the plates or backs N, which has just started to pass over the sprocket, is illustrated. It will also be seen from said figure that these plates N, which normally form backs for the excavating and elevating shovels, are independent of the plates H and move independently of the same and that in this way the shovels can be set at any desired distances apart upon the endless belt. As shown in Fig. 4, the link-section to which the plate N is attached is flexibly connected with the link-section to which the preceding and the succeeding plates H are attached, and hence when a plate or blade H is passing about the lower sprocket its position will be entirely independent of any of the plates N, and the latter will not be rigid with the projecting blades. The plates H, which thus project outwardly from the endless belt, and the plates N, which lie parallel with the belt except when passing about the sprockets, are associated in pairs to form a series of scrapers or shovels adapted for receiving and carrying upwardly the loosened soil. In Figs. 1 and 3 the plates N on the belt portions between the upper and lower sprockets are shown parallel with the portions of the belt to which they are attached, and in Fig. 3 one of the shovel-plates N, attached to a portion of the belt which is passing about the upper sprocket, is shown swung outwardly from the belt in dotted lines, the direction of swing thus performed by the said plate being in the direction in which the material discharges from the shovel. When the plate or back N of any one shovel is parallel with the portion of the endless belt formed by the sprocket-chains upon which such shovel is arranged, one end portion of such plate N will be within the portion of the shovel which receives and carries the material—that is to say, it will form, in conjunction with the plate H with which it is associated, an angular pocket or shovel-space for the material, and, as shown, said plate N will be attached beyond or outside of such space or pocket. It will also be seen that the endless belt is provided with a series of plates or blades H, projecting outwardly therefrom, and with plates N, which are attached to the belt at points between the plates H, whereby, as clearly shown in Fig. 4, the plates H and N are respectively attached to different links of the endless belt.

I claim as my invention—

1. In an excavating-machine, the combination with a shaft journaled in bearings on the frame of the machine and carrying parallel sprocket-wheels, of a frame swinging on an axis coincident with the axis of rotation of said shaft and adapted to depend therefrom, a shaft journaled in bearings on the free end of said frame, sprocket-wheels carried by said shaft, parallel sprocket-chains turned over said sprocket-wheels on both said shafts, scraper-plates carried by said chains, and an apron depending loosely from said frame of said machine and adapted to rest at its lower end upon the ground immediately in advance of the ditch, said apron being adapted to prevent the earth carried upwardly by said plates from leaving same at their point of exit from the ditch.

2. In an excavating-machine, the combination with a shaft carrying parallel sprocket-wheels and journaled in bearings upon the frame of the machine of a swinging frame swinging on an axis coincident with the axis of rotation of said shaft, a shaft journaled in bearings on the free end of said frame and carrying parallel sprocket-wheels, parallel sprocket-chains trained over said respective sprocket-wheels, scraper-plates extending between said chains and carried thereby, devices for depressing the free end of said swinging frame, a traveling carriage on the frame of said machine, a shaft carried thereby and provided with sprocket-wheels over which said sprocket-chains are trained, and means for locking said carriage against movement on said frame to hold sprocket-chains taut.

3. In an excavating-machine, the combination with a shaft journaled in bearings on the frame of the machine and carrying parallel sprocket-wheels, of a frame pivotally secured to said shaft and adapted to depend therefrom, a shaft journaled in bearings on the free end of said frame, sprocket-wheels carried by said shaft, parallel sprocket-chains trained over said sprocket-wheels on both said shafts, cutters carried by said sprocket-chains at intervals adapted to loosen the earth, plates alternated with said cutters and adapted to take the loosened earth, a scraper pivotally mounted upon the frame of the machine and adapted to be engaged by said plates to scrape the latter when they approach the upper limits of their motion.

4. In an excavating-machine, the combination with a shaft journaled in bearings on the frame of the machine and carrying parallel sprocket-wheels, of a frame pivotally secured to said shaft and adapted to depend therefrom, a shaft journaled in bearings on the free end of said frame, sprocket-wheels carried by said shaft, parallel sprocket-chains trained over said sprocket-wheels on both said shafts, cutters carried by said sprocket-chains at intervals adapted to loosen the earth, plates alternated with said cutters and adapted to take up the loosened earth, a swinging apron pivotally mounted upon the frame of the machine immediately in front of said sprocket-chains, a receptacle for earth in front of said apron, and a scraper pivotally mounted above said apron and adapted to engage said plates as they approach the upper limit of their movement to scrape the same and deliver the earth into said receptacle.

5. In an excavating-machine, the combination with a shaft journaled in bearings on the frame of the machine and carrying parallel sprocket-wheels, of a frame pivotally secured to said shaft and adapted to depend therefrom, a shaft journaled in bearings on the free end of said frame, sprocket-wheels carried by said shaft, parallel sprocket-chains trained over said sprocket-wheels on both said shafts, cutters carried by said sprocket-chains at intervals adapted to loosen the earth, plates alternated with said cutters and adapted to take up the loosened earth, a swinging apron pivotally mounted upon the frame of the machine immediately in front of said sprocket-chains, a receptacle for earth in front of said apron, conveyers leading from said receptacle, and a scraper pivotally mounted above said apron and adapted to engage said plates as they approach the upper limit of their motion to scrape the same and deliver the earth into said receptacle.

6. In an excavating-machine, the combination with a horizontal frame, drive-gear carried thereby, excavating devices geared to said drive-gear, and a swinging frame carrying said excavating devices and adapted to project above and below said horizontal frame, a windlass on the rear end of said horizontal frame connected with the free end of said swinging frame, a windlass at the forward end of said swinging frame, and a cross-beam connected therewith and adapted to be drawn tightly against the rear face of said swinging frame and the lower face of said horizontal frame, to hold said swinging frame in a lowered position.

7. In an excavating-machine, the combination with a windlass carried thereby and adapted to receive a rope secured at one end to a rigid device in the earth in the direction of motion of the machine, and a ratchet-wheel rigid relatively to said windlass, a lever pivoted concentric with said ratchet-wheel, and a pawl carried by said lever and adapted to engage said wheel, of a drive-shaft, and reciprocating devices actuated from said drive-shaft and connected with said lever for imparting a rocking motion thereto, whereby said machine is gradually advanced.

8. In an excavating-machine, the combination with a windlass carried thereby, and adapted to receive a rope secured at one end to a rigid device in the earth in the direction of motion of the machine, and a ratchet-wheel rigid relatively to said windlass, a lever pivoted concentric with said ratchet-wheel, and a pawl carried by said lever and adapted to engage said wheel, of a drive-shaft, an eccentric carried by said drive-shaft, and an eccentric-rod connected therewith at one end and at its other end with said lever for imparting a rocking motion thereto, whereby said machine is gradually advanced.

9. In an excavating-machine, the combination with excavating devices carried by a moving part of the machine and comprising flat plates extending practically transversely to their direction of motion, of a scraper situated in the path of said plates and adapted to be engaged thereby and forced out of their path, to scrape said plates, said scraper comprising a frame consisting of two parallel side plates pivoted at one end to said machine, a cross-piece mounted between the ends of said side plates and weights carried by the free ends of said side plates.

10. In an excavating-machine, the combination with excavating devices carried by a moving part of the machine and comprising flat plates extending practically transversely

BEST AVAILABLE COPY to their direction of motion, of a scraper situated in the path of said plates and adapted to be engaged thereby and forced out of their path, to scrape said plates, said scraper being mounted between parallel arms pivoted at one end to a part of the machine and normally held in the path of said plates by means of depressing devices engaging said frame.

11. In an excavating-machine, the combination with the drive-gear, a swinging frame pivotally mounted on same, and sprocket-chains carried by said frame, of excavating devices carried by said sprocket-chains and comprising flat plates extending practically transversely to said chains, plates lying against said chains forward of said first-named plates, and cutters mounted immediately behind each of said first-named plates and projecting beyond the edges of the latter for loosening earth to be taken up by the next succeeding plates.

12. In an excavating-machine, a shovel for receiving and elevating loosened earth and comprising a plate or apron forming an automatic cleaner or scraper and movably attached at a point outside the portion of the shovel which receives and carries the material.

13. A self-dumping elevating-shovel having a movable scraping or cleaning part arranged with one end in the portion of the shovel which carries the material, and attached at a point outside such portion of the shovel, and means for moving such scraping or cleaning part so as to force the material outwardly.

14. An elevator comprising a flexible endless belt passing over suitable direction-changing devices, one or more self-cleaning shovels connected therewith, each shovel forming a receptacle connected to the belt, a movable scraping or cleaning part in the soil-carrying portion of the shovel and projecting therefrom, said cleaning part being attached to a section of the belt at a point beyond the soil-carrying part of the shovel and adapted to be moved when passing the direction-changing devices so as to force the material outwardly.

15. In an excavating-machine, an endless belt provided with a series of elevating-shovels each comprising a projecting blade and a plate or apron normally forming a back for the shovel, said plates or aprons thus normally forming backs for the shovels being attached to swing independently of the projecting blades, and means for causing such backs to automatically swing outwardly and upwardly in directions to eject material when the shovels are in position for dumping.

16. In an excavating-machine, a suitable body-frame; an elevator-frame supported to incline downwardly and rearwardly from the body-frame of the machine; an endless belt supported to traverse the elevator-frame; and a series of excavating-shovels arranged upon the endless belt and each comprising a projecting blade, and a swinging plate normally forming a back for the shovel, said plates being independent of the projecting blades.

17. In an excavating-machine an endless belt provided with a series of excavating-shovels each comprising a projecting blade and a swinging plate normally forming a back for the shovel, the plates being attached to link-sections of the belt which are jointed to the link-sections to which the projecting blades are attached.

18. In an excavating-machine provided with suitable framework and with a forwardly-inclined endless traveling belt provided with excavating and elevating shovels having swinging backs arranged to automatically swing outwardly when the shovels are right side up and in position to discharge.

19. In an excavating-machine, a swinging frame; sprockets at opposite ends of the swinging frame; endless chains trained over the sprockets; plates projecting outwardly from the endless chains; and plates attached to the endless chains at points between the said outwardly-projecting plates and forming in conjunction with the latter a series of elevating-shovels; the plates thus attached to the endless chains at points between the outwardly-projecting plates being parallel with the portions of the chains to which they are attached when such portions are between the sprockets on the swinging frame, and being arranged to swing outwardly from the sprocket-chains when said portions thereof pass about the upper sprocket on the swinging frame.

20. In an excavating-machine, a swinging frame arranged to incline downwardly and rearwardly; an endless belt trained over direction-changing devices such as sprockets at opposite ends of the swinging frame; and means for elevating the soil comprising a series of plates positioned at intervals upon and projecting outwardly from the endless belt, and plates attached to the endless belt at points between the outwardly-projecting plates and arranged to swing outwardly when passing about the direction-changing devices; the endless belt being constructed with links, and the outwardly-projecting and outwardly-swinging plates being attached to different links.

In testimony whereof I affix my signature in presence of two witnesses

HANS J. BENTSON.

Witnesses:

CHARLES G. PAGE,

OTTILIE C. FREIBERG.